Patented Feb. 9, 1943

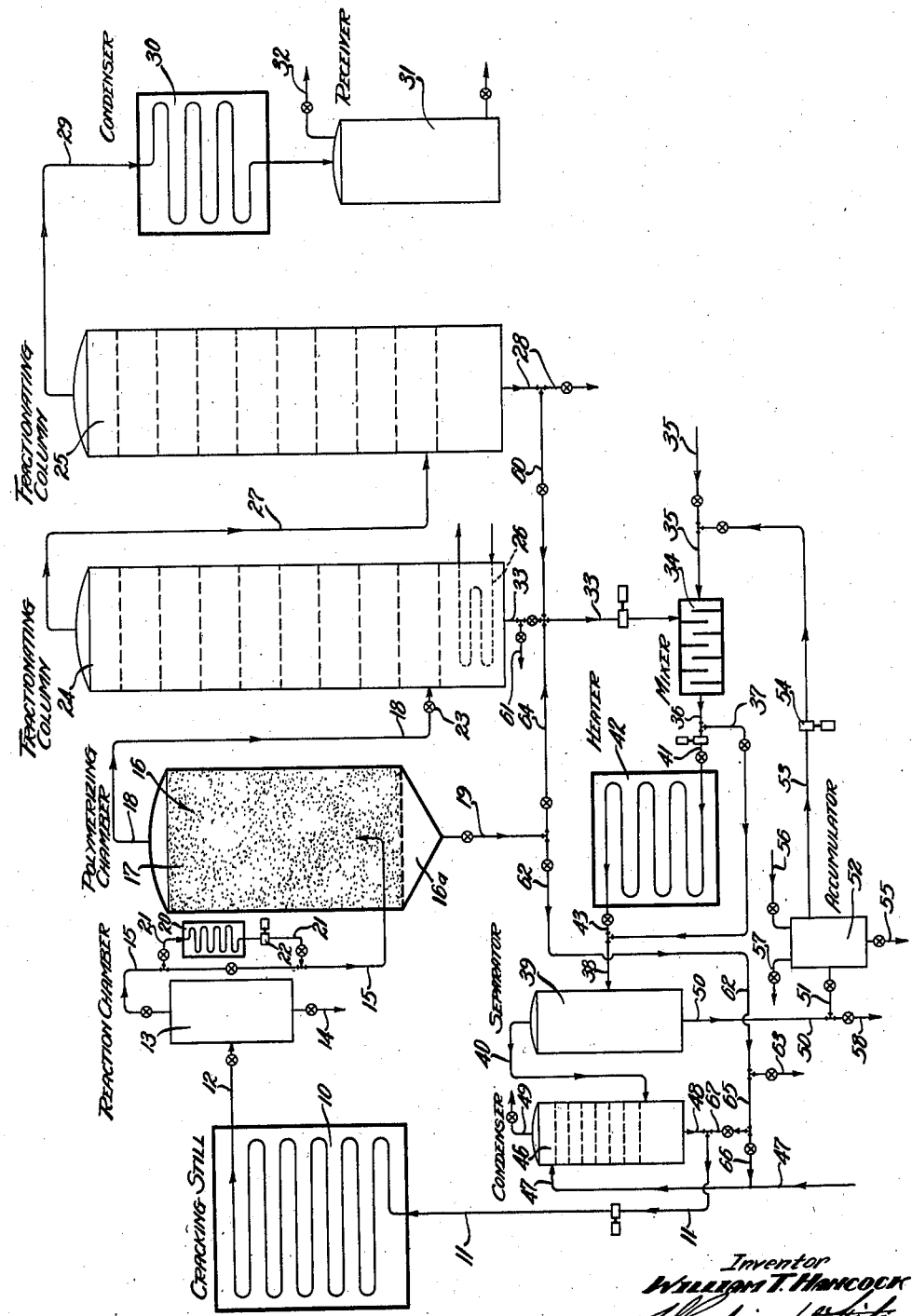

2,310,630

UNITED STATES PATENT OFFICE 2,310,630

METHOD OF POLYMERIZING AND CRACKING PETROLEUM HYDROCARBONS

William T. Hancock, Long Beach, Calif.

Application January 13, 1941, Serial No. 374,177

10 Claims. (Cl. 196—96)

This invention has to do generally with the refining of petroleum hydrocarbons, and relates particularly to improvements in that type of process according to which a suitable charging stock is subjected to cracking, the resulting cracked hydrocarbons polymerized and fractionated to produce gasoline and at least one fraction heavier than gasoline, and this heavier fraction then subjected to cracking and cracked constituents thereof returned to the polymerizing zone.

Limitations have been placed upon systems operating according to the cycle outlined above, by reason of the inability of the adsorptive material to retain its polymerizing efficiency beyond a comparatively limited period of time. Diminution of the efficiency of the material is due in large measure and more directly to its contamination by carbon, polymers and tarry bodies retained from the hydrocarbons being treated. Indirectly, such contamination is influenced by the nature and composition of the cracking still charging stock and the cracked hydrocarbons being put through the adsorptive material. In systems operating to recirculate cracked condensate for further cracking and return to the polymerizing zone, the continued effectiveness of the adsorptive material may be influenced by the presence in the condensate of impurities such as potential gum or tar-forming constituents, sulphur compounds and the like, which cannot effectively be removed by ordinary fractionation or distillation, and which carry through the cracking stage into the polymerizing zone.

My primary object is to provide a method whereby the recirculated condensate may be depleted of such objectionable constituents or impurities, to a degree that will effectively prolong the period of time during which the adsorptive material will retain its polymerizing effectiveness. Having determined that oils heavier or higher boiling than the recirculated condensate have a retentive or solvent affinity for the undesirable constituents of the condensate, I have provided by this invention a method for the extraction of such constituents from the condensate by subjecting the condensate to solvent treatment by the heavier oil in advance of the cracking stage, and then separating the condensate hydrocarbons from the solvent oil for cracking and return to the polymerizing zone.

According to the present method the cracked hydrocarbons are subjected to polymerization for one purpose, among others, of placing gum-forming and sulphur-containing constituents in a condition or form of composition particularly susceptible to removal at a later stage in the solvent oil. It is contemplated that polymerization of the hydrocarbons may be accomplished by any suitable method, and that any or a mixture of the commonly known polymerizing agents may be employed for the purpose. Adsorptive materials such as fuller's earth, bauxite, Death Valley and Murock clays, hydrated aluminum silicate, and activated clays in general, may be regarded as the preferred polymerizing agents. In place of, or in addition to these, I may use other polymerizing catalysts such as the metal chlorides and sulphates, oxides of chromium, molybdenum, vanadium and titanium, and solid acidic materials such as phosphoric anhydride. Polymerization also is known to be effected by high temperature-high pressure treatment of unsaturated or olefinic hydrocarbons.

Following the polymerization stage, the hydrocarbons are subjected to partial condensation to produce at least one fraction having a boiling range higher than gasoline and suitable as a cracking stock either together with or independently of the raw charging stock on which the system is operated. The solvent oil treatment extracts impurities from the condensate fraction, thereby freeing the latter of various objectionable constituents which would otherwise tend to contaminate the polymerizing material, or reduce the efficiency of the polymerizing stage, should such constituents be taken into the cracking system in the recirculated condensate stream.

It may be mentioned that the present system is adaptable for treatment by relatively high boiling solvent oil of a gasoline-containing fraction of the polymerized hydrocarbons, as in accordance with the process described in my Reissue Patent Number 21,655, issued December 10, 1940, on Process for refining cracked petroleum distillates. For purposes of the present application, the showing is confined to solvent oil treatment of a polymerized hydrocarbon fraction higher boiling than gasoline, as generally described in the foregoing.

The invention will be understood to better advantage from the following description of a typical and illustrative system embodying the invention, and shown diagrammatically and in flow sheet form in the accompanying drawing.

A raw charging stock derived from a source extraneous to the system and consisting of any of the usual cracking stocks such as gas oil, fuel oil or a suitable crude, is delivered to the cracking still 10 through line 11, together with recirculated hydrocarbons fractionated in the system as will hereinafter appear. The charging stock may be cracked in still 10 under any suitable temperature and pressure conditions, for example at a temperature ranging from 900 to 1200 degrees F. and under pressure of from 100 to 400 pounds per sq. in. The heated hydrocarbons are discharged from the cracking still through line 12 into a separating zone or reaction chamber 13 within which the hydrocarbons may be maintained over a length of time sufficient to permit completion of the cracking reactions, as fully understood by those familiar with the art. Unvaporized residuum containing carbon and tarry bodies is discharged from the reaction chamber through valved line 14, and the vaporized hydrocarbons pass overhead through line 15 for treatment in the polymerizing zone 16.

It is to be understood that in the broad aspects of the invention, the hydrocarbons may be subjected to polymerization within zone 16, in either vapor or liquid phases, or in mixed liquid and vapor phases, and that polymerization may be effected by intimately contacting the hydrocarbons with any suitable type or composition of adsorptive material capable of producing polymerization. For example, chamber 16 may contain a body 17 of adsorptive clay of the fuller's earth type which may or may not be treated by an acid or other electrolyte, and which may or may not contain additives such as metals or metallic compound catalysts incorporated in the clay for such purposes as to improve or modify its catalytic action, or to serve such purposes as to facilitate sulphur removal.

The hydrocarbon vapors may flow directly from the reaction chamber 13 through line 15 into the polymerizing chamber, and therein upwardly through the adsorptive material 17 to the vapor outlet line 18. During their flow through the adsorptive material, the hydrocarbons undergo polymerization, with the resultant formation of relatively high boiling liqlid polymers which drain into the base 16a of the chamber for removal through valved line 19. Removal of the polymers from the adsorptive material may be facilitated by permitting partial condensation of the vapors within the clay, and thereby causing the condensate to dilute and wash out the polymers. With condensate present in the chamber 16, the hydrocarbons of course undergo polymerization in mixed liquid and vapor phases. As illustrative of an adaptation of the system whereby the hydrocarbons may undergo polymerization in liquid phase, I show a condenser 20 in by-pass line 21, within which vapors from line 15 may be condensed and the condensate then discharged by pump 22 through the polymerizing zero. Under conditions of liquid phase treatment, polymers gravitating to the base 16a of the chamber may be removed as more fully described in my copending application Ser. No. 306,307, filed November 27, 1939, on System for refining petroleum oils. The desired pressure conditions for treatment of the hydrocarbons within the polymerizing zone under any of the described conditions, may be maintained by adjustment of a back pressure valve 23 in line 18.

The polymerized hydrocarbons discharged from chamber 16 may be subjected to fractionation to produce a vapor fraction containing hydrocarbons of the gasoline range, and a liquid fraction having a boiling range higher than gasoline, by any suitable method or equipment. As illustrative, I show a series arrangement of fractionating columns 24 and 25 from which are obtained two fractions having higher boiling ranges than gasoline. The hydrocarbons entering column 24 are fractionated to produce a liquid or condensed fraction corresponding substantially to gas oil and having a boiling range say from about 450° F. to 650° F. A heating coil or reboiler 26 in the base of column 24 may be used to aid in vaporizing all hydrocarbons more volatile than the desired fraction. The vapors leaving column 24 through line 27 are fractionated in column 25 to produce a condensate that may correspond substantially to kerosene distillate having a boiling range of from about 380° F. to 450° F., and which is withdrawn through line 28 to storage, or for treatment and recirculation to the cracking still, as will presently appear. The gasoline vapors passing overhead from column 25 flow through line 29 into condenser 30, the condensate from which is collected in receiver 31 and the fixed and uncondensed gases released through valved line 32.

The invention is more directly concerned with the further treatment given the bottoms removed from either or both of the fractionating columns 24 and 25, depending upon their individual or collective suitabilities as condensate to be recirculated to the cracking stage. Gas oil to be recirculated from fractionating column 24 is discharged through line 33 into a flow line or mixer 34 wherein the gas oil is intimately admixed with at least an equal and preferably greater volume of solvent oil entering the mixer through line 35. This solvent oil will have a substantially higher boiling range than the gas oil, and may consist of a high boiling petroleum fraction such as fuel oil, or a suitable crude which may contain gas oil and even lighter fractions. According to one mehod of operation, the solvent oil may be preheated when introduced to the mixer to a temperature of around 600 degrees F., so that the volume of solvent oil used (say 4 times the volume of the gas oil) will be sufficient to produce vaporization and separation of the gas oil. In this instance, the mixture may be discharged through lines 36, 37 and 38 into a separator 39 from which the gas oil and lighter fractions are flash vaporized and removed through line 40. Where the solvent oil introduced to the mixer 34 is unheated, or only partially preheated, the mixture may be discharged through line 41 into a heater 42 within which the temperature of the mixed oils is raised sufficiently high that when discharged through lines 43 and 38 into the separator, the gas oil and lighter fractions will vaporize and separate through line 40.

Having been depleted of undesirable and contaminating constituents retained by the residual solvent oil, the hydrocarbons removed from the separator through line 40 may be subjected to cracking and the resulting cracked hydrocarbons returned for treatment in the polymerizing chamber 16, by any suitable method. Merely as illustrative of a typical and preferred method, I show a system whereby the hydrocarbons separated from the solvent oil are subjected to cracking in still 10 together with the charging stock, so that the combined cracked products of the charging stock and recirculated hydrocarbons together undergo polymerization in chamber 16. The vapors from line 40 enter the lower interior of a condenser 46 to which the cracking still charging stock is supplied through line 47. Rising countercurrently to the down-flowing stream of charging stock, the vapors are condensed, and the mixture of the thus preheated charging stock and condensate passes through lines 48 and 11 to the cracking still. Any vapors or gases remaining uncondensed in condenser 46 may be removed through the valved outlet line 49.

If desired, the gas oil condensate from fractionating column 24 may be admixed with a continuously circulated stream of the higher boiling solvent oil, the composition of which may be kept suitably uniform or free from excessive accumulations of impurities and heavy bodies removed from the gas oil, by dilution with fresh solvent oil and removal of sedimentary accumulations. According to this system, the residual solvent oil in separator 38 is removed through lines 50 and 51 to an accumulator 52, from a relatively high level in which the oil is withdrawn through line 53 and recirculated by pump 54 to the mixer 34. Tarry or other relatively heavy residual bodies may be removed from the solvent oil stream by gravitation to the bottom of the accumulator 52 and withdrawn continuously or intermittently, through the valved outlet 55. Make-up solvent oil may be supplied to the circulated stream directly through line 35, or through pipe 56 leading to the accumulator. Gases and vapors may be expelled from the accumulator through vent line 57. Where the system is designed to operate without recirculation of the solvent oil stream as just described, the residual solvent oil in separator 39 may be discharged from the system through line 58.

As previously mentioned, the recirculated condensate may include either or both the bottoms from fractionating columns 24 and 25. Where it is desired to recirculate a kerosene distillate or like fraction from column 25, the oil may be taken to the mixer line 33 through pipe 60. If undesired in the recirculated stock, the higher boiling bottoms from fractionating column 24 may be taken to storage or other disposition through line 61.

The polymer stream being removed from chamber 16 through line 19 may be discharged from the system through lines 62 and 63, or introduced to a suitable stage in the condensate recirculation system to permit cracking of a portion or all the constituents of the polymer stream. Accordingly, the polymer stream may be discharged through line 64 into the condensate stream flowing through line 33 to the mixer, or the polymers may pass through lines 62 and 65 to be admixed via line 66 with the charging stock flowing through line 47 to the condenser, or admixed through line 67 with the charging stock-condensate mixture being removed from the condenser.

I claim:

1. The process of refining petroleum oils that includes, subjecting heated gasoline-containing cracked hydrocarbons to polymerization by contacting the hydrocarbons with a polymerizing medium in a treating zone, continuously fractionating the polymerized hydrocarbons to produce a vaporous fraction containing hydrocarbons of the gasoline range and a liquid fraction having a boiling range higher than gasoline, then mixing said liquid fraction with solvent petroleum oil having a higher boiling range than said liquid fraction, vaporizing and separating the last mentioned fraction from the solvent oil to leave residual oil containing impurities removed from the hydrocarbons of said liquid fraction, and recirculating and admixing a stream of the residual oil with the liquid fraction being produced by said fractionation of the polymerized hydrocarbons.

2. The process of refining petroleum oils that includes, subjecting heated gasoline-containing cracked hydrocarbons to polymerization in a treating zone, continuously fractionating the polymerized hydrocarbons to produce a vaporous fraction containing hydrocarbons of the gasoline range and a liquid fraction having a boiling range higher than gasoline, then mixing said liquid fraction with solvent petroleum oil having a higher boiling range than said liquid fraction, vaporizing and separating the last mentioned fraction from the solvent oil to leave residual oil containing impurities removed from the hydrocarbons of said liquid fraction, and recirculating and admixing a stream of the residual oil with the liquid fraction being produced by said fractionation of the polymerized hydrocarbons.

3. The process of refining petroleum oils that includes, subjecting heated gasoline-containing cracked hydrocarbons to polymerization by contacting the hydrocarbons with a polymerizing medium in a treating zone, continuously fractionating the polymerized hydrocarbons to produce a vaporous fraction containing hydrocarbons of the gasoline range and a liquid fraction having a boiling range higher than gasoline, then mixing said liquid fraction with solvent petroleum oil having a higher boiling range than said liquid fraction, vaporizing and separating the last mentioned fraction from the solvent oil to leave residual oil containing impurties removed from the hydrocarbons of said liquid fraction, recirculating and admixing a stream of the residual oil with the liquid fraction being produced by said fractionation of the polymerized hydrocarbons, and adding fresh solvent oil to said recirculated stream of the residual oil.

4. The process of refining petroleum oils that includes, subjecting heated gasoline-containing cracked hydrocarbons to polymerization by contacting the hydrocarbons with a polymerizing medium in a treating zone, continuously fractionating the polymerized hydrocarbons to produce a vaporous fraction containing hydrocarbons of the gasoline range and a liquid fraction having a boiling range higher than gasoline, then mixing said liquid fraction with solvent petroleum oil having a higher boiling range than said liquid fraction, vaporizing and separating the last mentioned fraction from the residual solvent oil to leave therein impurities removed from the hydrocarbons of said liquid fraction, admixing the separated vapor fraction with charging stock to condense the vapors and preheat said stock, recirculating and admixing a stream of said residual oil with the liquid fraction being produced by said fractionation of the polymerized hydrocarbons, subjecting the charging stock to cracking, and passing resulting cracked hydrocarbons into said treating zone for polymerization by said polymerizing medium.

5. The process of refining petroleum oils that includes, subjecting heated gasoline-containing cracked hydrocarbons to polymerization by contacting the hydrocarbons with a polymerizing medium in a treating zone, continuously fractionating the polymerized hydrocarbons to produce a vaporous fraction containing hydrocarbons of the gasoline range and a liquid fraction having a boiling range higher than gasoline, then mixing said liquid fraction with solvent petroleum oil having a higher boiling range than said liquid fraction, vaporizing and separating the last mentioned fraction from the solvent oil to leave residual oil containing impurities removed from the hydrocarbons of said liquid fraction, subjecting the hydrocarbons of the separated vaporized fraction to cracking, passing resulting cracked hydrocarbons into said treating zone for polymerization by said polymerizing medium, and recirculating and admixing a stream of the residual oil with the liquid fraction being produced by said fractionation of the polymerized hydrocarbons.

6. The process of refining petroleum oils that includes, subjecting heated gasoline-containing cracked hydrocarbons to polymerization by contacting the hydrocarbons with adsorptive material in a treating zone, continuously fractionating the polymerized hydrocarbons to produce a vaporous fraction containing hydrocarbons of the gasoline range and a liquid fraction having a boiling range higher than gasoline, then mixing said liquid fraction with solvent petroleum oil having a higher boiling range than said liquid fraction, vaporizing and separating the last mentioned fraction from the solvent oil to leave residual oil containing impurities removed from the hydrocarbons of said liquid fraction, passing charging stock through a cracking zone and introducing resulting cracked hydrocarbons into said treating zone, cracking the hydrocarbons separated from said solvent oil and introducing cracked constituents thereof to the treating zone, and recirculating and admixing a stream of the residual oil with the liquid fraction being produced by said fractionation of the polymerized hydrocarbons.

7. The process of refining petroleum oils that includes, subjecting heated gasoline-containing cracked hydrocarbons to polymerization by contacting the hydrocarbons with a polymerizing medium in a treating zone, continuously fractionating the polymerized hydrocarbons to produce a vaporous fraction containing hydrocarbons of the gasoline range and a liquid fraction having a boiling range higher than gasoline, then mixing said liquid fraction with solvent petroleum oil having a higher boiling range than said liquid fraction, vaporizing and separating the last mentioned fraction from the solvent oil to leave residual oil containing impurities removed from the hydrocarbons of said liquid fraction, recirculating and admixing a stream of the residual oil with the liquid fraction being produced by said fractionation of the polymerized hydrocarbons, and continuously heating the recirculated stream of oil.

8. The process of refining petroleum oils that includes, subjecting heated gasoline-containing cracked hydrocarbons to polymerization by contacting the hydrocarbons with a polymerizing medium in a treating zone, continuously fractionating the polymerized hydrocarbons to produce a vaporous fraction containing hydrocarbons of the gasoline range and a liquid fraction having a boiling range higher than gasoline, then mixing said liquid fraction with solvent petroleum oil having a higher boiling range than said liquid fraction, passing the resulting mixture through a heating zone and vaporizing and separating the last mentioned fraction from the solvent oil to leave residual oil containing impurities removed from the hydrocarbons of said liquid fraction, and recirculating and admixing a stream of the residual oil with the liquid fraction being produced by said fractionation of the polymerized hydrocarbons.

9. The process of refining petroleum oils that includes, subjecting heated gasoline-containing cracked hydrocarbons to polymerization by contacting the hydrocarbons with a polymerizing medium in a treating zone, continuously fractionating the polymerized hydrocarbons to produce a vaporous fraction containing hydrocarbons of the gasoline range and a liquid fraction having a boiling range higher than gasoline, then mixing said liquid fraction in a mixing zone with solvent petroleum oil having a higher boiling range than said liquid fraction, vaporizing and separating the last mentioned fraction from the solvent oil to leave residual oil containing impurities removed from the hydrocarbons of said liquid fraction, recirculating and admixing a stream of the residual oil with the liquid fraction being produced by said fractionation of the polymerized hydrocarbons, and passing said recirculated stream of residual oil through an enlarged accumulator zone and through said mixing zone.

10. The process of refining petroleum oils that includes, subjecting heated gasoline-containing cracked hydrocarbons to polymerization by contacting the hydrocarbons with a polymerizing medium in a treating zone, continuously fractionating the polymerized hydrocarbons to produce a vaporous fraction containing hydrocarbons of the gasoline range and a liquid fraction having a boiling range higher than gasoline, then mixing said liquid fraction in a mixing zone with solvent petroleum oil having a higher boiling range than said liquid fraction, vaporizing and separating the last mentioned fraction from the solvent oil to leave residual oil containing impurities removed from the hydrocarbons of said liquid fraction, recirculating and admixing a stream of the residual oil with the liquid fraction being produced by said fractionation of the polymerized hydrocarbons, passing said recirculated stream of residual oil through an enlarged accumulator zone and through said mixing zone, withdrawing heavy tarry bodies from said accumulator zone, and adding fresh solvent oil to the recirculated stream.

W. T. HANCOCK.